United States Patent [19]

Lee et al.

[11] Patent Number: 4,533,715
[45] Date of Patent: Aug. 6, 1985

[54] SINGLE PACKAGE EPOXY RESIN SYSTEM

[75] Inventors: Frank W. C. Lee, Dublin; Kenneth S. Baron, San Ramon, both of Calif.

[73] Assignee: Hexcel Corporation, San Francisco, Calif.

[21] Appl. No.: 530,106

[22] Filed: Sep. 7, 1983

[51] Int. Cl.³ .................... C08G 18/81; C08G 18/28
[52] U.S. Cl. .................................. 528/45; 525/396;
525/438; 525/526; 525/529; 528/73; 528/98;
528/102; 528/107; 528/361; 548/323; 548/341
[58] Field of Search ............... 525/528, 529, 396, 438,
525/526; 528/117, 119, 120, 367, 98, 102, 107,
361, 45, 73; 548/323, 341, 336

[56] References Cited

U.S. PATENT DOCUMENTS 4,293,561 10/1981 Walker ................................. 548/341
4,335,228 6/1982 Beitchman et al. ................. 528/117
4,358,571 11/1982 Kaufman et al. ................... 528/117

Primary Examiner—John Kight
Assistant Examiner—Kriellion Morgan
Attorney, Agent, or Firm—Oblon, Fisher, Spivak, McClelland & Maier

[57] ABSTRACT

A curing agent for one package epoxy resin systems is disclosed as a imidazole blocked naphthyl diisocyanate which, when incorporated in epoxy resins, has an extended shelf life and can be cured by exposure to relatively low temperatures. The curing agent is insoluble in epoxy resins that are liquid at room temperature and is useful in connection therewith.

12 Claims, 1 Drawing Figure

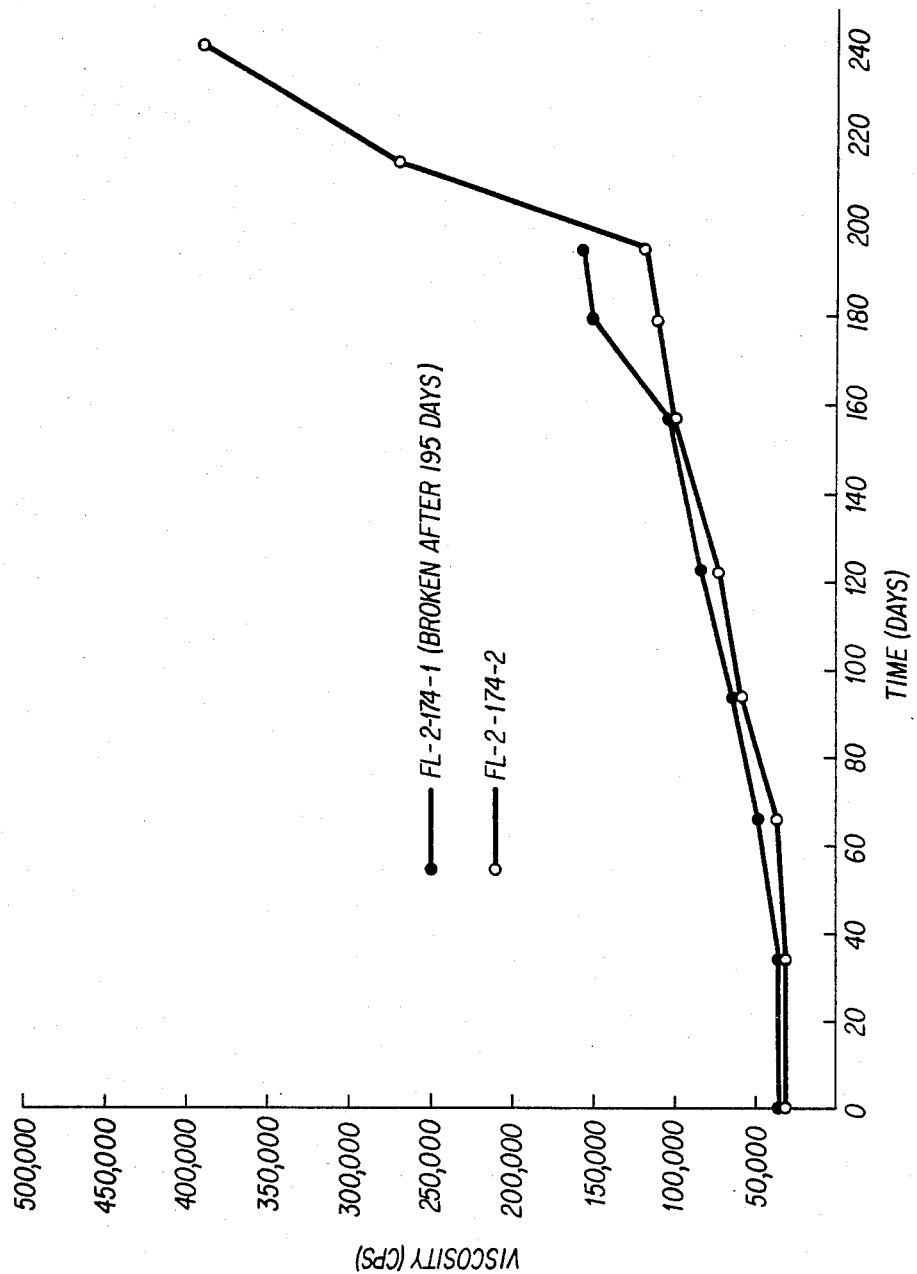

SINGLE PACKAGE EPOXY RESIN SYSTEM

BACKGROUND OF THE INVENTION

1. Field of the Invention

This invention relates to single package epoxy resin systems, which can be caused to harden into a cured state upon application of heat only. More specifically, this invention relates to a "hardening monomer" for epoxy resins which is insoluble in liquid resin polymers at low temperatures.

2. Description of the Prior Art

Curable epoxy resin systems have long been employed for a variety of important utilities, particularly as adhesives, and resins for structural elements. Conventionally, use of an epoxy required the application of the uncured epoxy polymer to the surface or area wherein the cured resin is to be formed, and thereafter addition of a "hardening monomer" which, upon the application of heat, caused the polymer to undergo crosslinking and curing, into a "hardened" state. Unfortunately, the application of such resin systems was frequently performed by those without particular skill in the art, and the extensive handling of the "two package" system of a polymer and a monomer resulted in messy and inferior products.

Recently, industry efforts have been focused on the provision of "one package" epoxy resin systems, wherein the hardener is dispersed within the epoxy polymer, but inactive in the stored state. The system may be applied to the article to be provided with the epoxy resin, and, upon the application of heat, the epoxy resin hardens. However, problems have continued to plague the provision and use of such "one package" systems.

One particular problem encountered has been the extremely short shelf life of the one package systems. Over time, the hardening monomer tends to react with the polymer, even in the absence of the application of heat. Thus, in a matter of a few days, or weeks, the system may become unusable, due to premature curing. European patent application No. 0024119, published Feb. 23, 1981 addresses a one package system employing a hardener identified, in a preferred form, as a succinic acid salt of imidazole modified by phenyl isocyanate. However, when combined with an epoxy resin of polyglycidyl ether, the system was found to have only a 2-3 day shelf life.

Another problem frequently encountered is the high heat necessary for curing, or the long duration of exposure to elevated heat necessary for curing the one package system. Dicyandiamide is widely used as a curative for epoxy resins, particularly in "one package" systems, as the storage stability of such a system at room temperatures of 70°-78° F. is excellent. However, the temperatures required to bring the curing reaction to completion (in excess of 350° F.) are too high for many of the preferred applications of epoxy resins, such as their use in bonding adhesives, prepregs, laminates and coatings. Further, in many cases, these high temperatures must be maintained for prolonged periods. The curing of the epoxy resin system may be accelerated by addition of various amine salts. However, the presence of the additives severely, adversely effects the strength of the cured product, and storage durability of the one package system. Further, many additives have only a slight accelerating effect.

In an effort to overcome the above-described difficulties, U.S. Pat. No. 4,335,228 describes as curing catalysts isocyanate blocked imidazole or imidazoline compounds. These catalysts, and the one package systems employing them, are described as having outstanding shelf life, lower curing temperatures, and faster cure times. However, the "lower curing temperatures" of those systems are still on the order of 250° F. to 400° F. (column 2, line 58), which may be too high for many important applications. Of even greater importance is the limitation of the curing catalyst of U.S. Pat. No. 4,335,228 to use with epoxy resins which are solid at room temperature, and preferably have melting points of 60° C. or more. Column 3, lines 12–16. Many important epoxy resins, including some of the diglycidyl ethers referred to above, are viscous liquids at room temperatures, and not suitable for use with the curing agents of the referenced patent.

Accordingly, a need continues to exist for a curing agent for epoxy resins which can be incorporated in a one package system which is suitable for use in liquid resins, has an extended shelf life and fairly quick cure times at relatively low temperatures.

SUMMARY OF THE INVENTION

It has been discovered that imidazole blocked naphthyl diisocyanates are substantially insoluble (at room temperature) in epoxy resins which are liquid at room temperature, but become soluble therein upon application of heat. As the blocked naphthyl diisocyanate is solubilized upon the application of heat, curing of the epoxy resin is catalyzed, at temperatures as low as 160° F. At a temperature of 200° F., cure times are as low as 20–25 minutes, or less at elevated temperatures. Yet, because of its insolubility, the curing agent milled into the epoxy resin system, whether liquid or solid, and stored at room temperature has an excellent shelf life as a one package system, the shelf life being in excess of 6 months.

It is therefore one object of this invention to provide a curing agent for epoxy resins which can be incorporated in epoxy resins as a one package system.

It is another object of this invention to provide such a one package system which has an excellent, extended shelf life.

It is a further object of this invention to provide a curing agent for epoxy resins which may be incorporated in epoxy resins that are liquid at room temperature, the one package systems having extended shelf lives.

It is yet another object of this invention to provide one package epoxy resin systems which may be cured upon the application of relatively low heat for relatively short periods of time.

BRIEF DESCRIPTION OF THE DRAWINGS

FIG. 1 is a graphic illustration of the shelf life of the current invention, as determined by gel time.

DETAILED DESCRIPTION OF THE INVENTION

The curing agent or catalyst of this invention, as a curing agent and as a component of a one package epoxy system, is an imidazole blocked naphthyl diisocyanate which can be easily prepared from available chemicals, according to the reaction pathway described below:

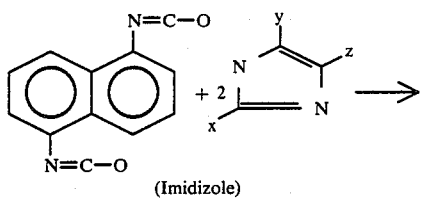

(1,5-Napthalene Diisocyanate) (Imidizole)

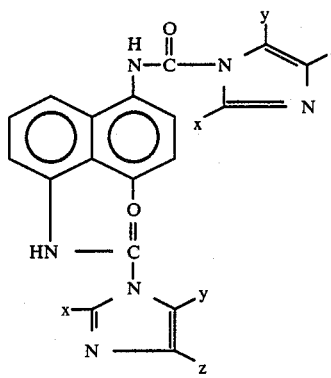

wherein x, y and z may be the same or different and can be hydrogen, alkyl or aryl of $C_{1-12}$, halos, nitros, etc. Representative species include Imidazole, 2-ethyl imidazole, 2-ethyl-4-methylimidazole, 2-phenylimidazol, 4-nitroimidazole, 2-methyl-4(5)-nitroimidazole, 2-isopropylimidazole, 2-isopropyl-4(5)-nitroimidazole, 4-methylimidazole, 2-chloro-imidazole, 4-methyl-5-imidazolcarbon square-ethylester, Benzimidazol.

It has been discovered that the adducts of this particular diisocyanate and imidazole, unlike those of the prior art, is highly insoluble in epoxy resins which are liquid at room temperature, but become soluble in the same resins when the temperature is elevated. Upon dissolving in the heated resin mixture, the curing agent catalyzes the curing of the epoxy resin, at temperatures markedly lower than those employed in the prior art. They can be employed for conventional utilities such as prepregs, laminates, and as adhesives, coatings and finishes.

The epoxy resins that can be employed with this curing agent in a one package system can be either solid or liquid at room temperature, the form of the resin dictating the method of incorporating the curing agent therein. Typical resins are polyglycidyl ethers obtained by the reaction of epichlorohydrin with bis-Phenol A. The lower molecular weight resins of this family will be viscous liquids at room temperatures of 70°-78° F. When incorporated in such a viscous liquid, the curative may be dispersed therein either by conventional milling or stirring procedures. When incorporated in a solid resin, the curing agent should be incorporated by conventional milling processes, such as a 3-roll mill.

Suitable resins include 3,4-epoxycyclohexylmethyl-(3,4-epoxy) cyclohexanecarboxylate (ERL 4221 by Union Carbide or Araldite CY 179 by CIBA Geigy), bis (3,4-epoxy-6-methylcyclohexylmethyl) adipate (ERL 4289 by Union Carbide or CY 178 by Ciba), Vinylcyclohexenedioxide (ERL 4206 by Union Carbide), bis (2,3-epoxycyclopentyl) ether (ERL 4205 by Carbide), Glycidyl ethers of polyphenol epoxy resins such as liquid or solid bisphenol A diglycidyl ether epoxy resins (Epon 828, Epon 826, Epon 1001 and Epon 1002 by Shell DER 331, DER 332 by Dow Chemical), Tetraglycidyl methylenedianiline (TGMDA) (MY720 by Ciba), Tris(Hydroxyphenyl) methane based epoxy resins (XD-7342.002 experimental epoxy resin by Dow Chemical Co.), Flame retardant epoxy resins such as halogen containing bisphenol A diglycidyl ether epoxy resins (DER 542, DER 511 by Dow), Phenol-formaldehyde Novolac polyglycidyl ether epoxy resins (such as DEN 438, 431 by Dow), Diglycidyl hexahydrophthalate (Araldite CY183 by Ciba and ED-5662 by Celanese). Other cycloaliphatic epoxies (such as Araldite CY179 and CY192 by Ciba, ERL 4090, 4205 by Union Carbide), 2-(3,4-epoxy) cyclohexyl-5,5-spiro (3.4-epoxy)-cyclohexane-m-dioxane, (CY175 by Ciba, ERL 4234 by Union Carbide).

When incorporated in a one package epoxy resin system, the curing agent of this invention should be present in amounts of approximately 0.1-10% by weight of the weight of the resin depending on application, preferably 3-4% by weight. Such a one package system may be completely cured by exposure to temperatures of 200° F., for a period of 20-25 minutes. At 250° F., curing to a hard infusible adhesive state is achieved in less than 15 minutes. The same one package system has been demonstrated to have a shelf life, at temperatures between 70°-78° F., of between 6 and 8 months.

The epoxy resin system of this invention may further include conventional fillers and additives such as pigments and colorants. Fillers may be generally used to increase performance at high temperature, reduce the coefficient of thermal expansion, increase thermal conductivity, decreasing shrinkage (by reducing peak exotherm temperature) and alter moisture resistance. Suitable fillers include calcium carbonate, talc, aluminum oxide, flint powder, silica, mica and metallic powders (Al, Zn, etc.).

Common pigments that may be used include titanium dioxide, aluminum powder, carbon black, and cadmium red medium and cadmolith golden, both produced by The Chemical and Pigment Co.

This invention can be further understood by reference to the following examples which are advanced for illustrative purposes only and are not intended to limit the scope of the invention. All percentages are by weight, unless otherwise indicated.

EXAMPLE 1

Preparation of Naphthyl Diisocyanate Blocked Imidazole

A 2 liter, three neck flask, equipped with a condensor, a mechanical stirrer, a thermometer and a nitrogen inlet was charged with 75.0 gm of 1,5-naphthalene diisocyanate (0.3571 mole) and 750 gm of dry ethyl acetate. The reaction flask was heated to 60° C., when all of the naphthlene diisocyanate was dissolved. Two drops of dibutyltin dilaurate (T-12 M and T chemicals) was added as catalyst. Imidazole (45.0 gm, 0.6607 mole) dissolved in 200 gm of ethyl acetate was added through an additional funnel in 20 minutes at 60° C. White precipitate appeared a few minutes after the addition of imidazole. The reaction mixture was heated to reflux for one hour. The reaction mixture was cooled to approximately 60° C. and filtered by suction. The white powder obtained was washed with hot ethyl acetate and dried under vacuum.

The dry weight of the product obtained was 117.1 gm (97.6% theoretical yield) and the powdery white product decomposed at 218° C.

EXAMPLE 2

Cure Test

About 3-4% of the reaction product of 1,5-naphthalene diisocyanate and imidazole of Example 1 was milled into an epoxy resin of polyglycidyl ether obtained by the reaction of epichlorohydrin with bis-Phenol A (EPON 828). A small amount of this finely milled mixture (0.5-1.0 gm) was placed on calibrated hot plates set at 160°, 180°, 210° and 250° F. to observe cure times (hard, infusible state) at the respective temperatures. The results are reflected in Table 1

| Formulation | A | B | C | D | E | F |
|---|---|---|---|---|---|---|
| 828 | 100 | 100 | 100 | 100 | 100 | 100 |
| NDI-Imidazole | 4 | 4 | 4 | 4 | 4 | 4 |
| Resorcinol | | 2 | | | | |
| BHT | | | 2 | | | |
| HER | | | | 2 | | |
| HQEE | | | | | 2 | |
| DEG | | | | | | 2 |

TABLE 1

Tack Free Time vs. Temp.
Tack-Free Time (Min.)

| | 160° F. | 180° F. | 200° F. | 250° F. |
|---|---|---|---|---|
| A | 300 | 105 | 24 | 5 |
| B | 150 | 90 | 14 | 2 |
| C | 180 | 120 | 23 | 2 |
| D | 105 | 60 | 17 | 2 |
| E | 105 | 56 | 16 | 2 |
| F | 120 | 66 | 19 | 2 |

(BHT) 2,6,-Di-tert-butyl-para-Cresol
(HQEE) Hydroquinone,-Di-(Beta-Hydroxy Ethyl) Ether
(HER) Resorcinol,-Di-(beta-hydroxy Ethyl) Ether
(DEG) Diethylene Glycol

EXAMPLE 3

Shelf Life Test

Shelf life was determined by placing samples of the milled product of Example 2 with and without dicyandiamide as detailed below at common room temperatures (70°-78° F.) and occasionally observing the thickness or the flow of the resin mixture, which is liquid at room temperature. Occasionally, the viscosities of such samples were measured. The results, demonstrating a shelf life of 6-8 months, are reflected in Table 2 and graphically illustrated in FIG. 1.

| Formulation 1 | Wt. (gm) |
|---|---|
| 828 | 200 |
| Dicyandiamide | 11.4 |
| NDI-Imidazole | 6 |

| Formulation 2 | Wt. (gm) |
|---|---|
| 828 | 200 |
| NDI-Imidazole | 8.0 |

| Y* (cps) | TIME (DAYS) | | | | | | | | | |
|---|---|---|---|---|---|---|---|---|---|---|
| Sample | 0 | 34 | 66 | 94 | 122 | 157 | 179 | 195 | 214 | 240 |
| Formulation 1 | 36,000 | 36,250 | 49,000 | 65,000 | 84,000 | 104,000 | 150,000 | 156,000 | — | — |
| Formulation 2 | 32,000 | 32,500 | 38,000 | 60,000 | 73,000 | 101,000 | 110,000 | 118,000 | 268,000 | 388,000 |

*Gel time of the sample was determined at the point when the viscosity was a factor of ten of the original viscosity. Viscosity was taken at ambient temperature between 70-78° F.

This invention has been described above with respect to various embodiments. Particularly, various weight relationships, temperatures and times have been identified. However, these embodiments are advanced as illustratively only, and are not intended to limit the invention. Variations will occur to those of ordinary skill in the art without the exercise of inventive faculty, which remain within the scope of the invention as claimed below.

What is claimed as new and desired to be secured by Letters Patent of the United States is:

1. A curing agent for epoxy resins having the formula

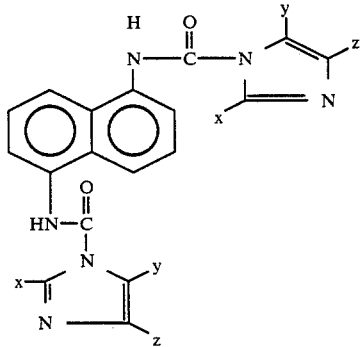

wherein x, y, and z may be the same or different, and each may be hydrogen, a lower alkyl or aryl of $C_{1-12}$, halo or nitro.

2. The curing agent of claim 1, wherein x, y, and z are each hydrogen.

3. A one package epoxy resin system comprising:
a curable epoxy resin, and
a curing agent of the formula

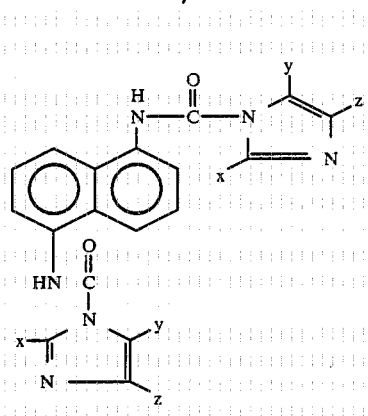

wherein x, y and z may be the same or different, and each may be hydrogen, a lower alkyl or aryl of $C_{1-12}$, halo or nitro, said curing agent present in amounts of 0.1–10% by weight.

4. The one package epoxy resin system of claim 3, wherein x, y and z of said curing agent are each hydrogen.

5. The one package epoxy resin system of claim 3, wherein said curing agent is present in amounts of 3–4% by weight.

6. The one package epoxy resin system of claim 4, wherein said curing agent is present in amounts of 3–4% by weight.

7. The one package epoxy resin system of claim 3, wherein said epoxy resin system has a shelf life of 6–8 months.

8. The one package epoxy resin system of claim 3, wherein said system can be cured by exposure to a temperature of 160° F.

9. The one package epoxy resin system of claim 3, wherein said system can be cured by exposure to a temperature of 200° F. for 20–25 minutes.

10. The one package epoxy resin system of claim 3, wherein said system may be cured by exposure to a temperature of at least 250° F. for less than 15 minutes.

11. The one package epoxy resin system of claim 3, wherein said curable epoxy resin is a viscous liquid at room temperature.

12. The one package epoxy resin system of claim 4, wherein said curable epoxy resin is a viscous liquid at room temperature.

* * * * *